US012046149B1

(12) United States Patent
Datray et al.

(10) Patent No.: US 12,046,149 B1
(45) Date of Patent: Jul. 23, 2024

(54) DYNAMIC PARTITIONING OF A REFRESHABLE BRAILLE DISPLAY BASED ON PRESENCE OF ANCILLARY ALPHANUMERIC CONTENT

(71) Applicant: Freedom Scientific, Inc., Clearwater, FL (US)

(72) Inventors: James T. Datray, Louisville, KY (US); Joseph Kelton Stephen, Winkleigh (AU); Glen Gordon, Madison, WI (US)

(73) Assignee: Freedom Scientific, Inc., Clearwater, FL (US)

( * ) Notice: Subject to any disclaimer, the term of this patent is extended or adjusted under 35 U.S.C. 154(b) by 568 days.

(21) Appl. No.: 17/178,759

(22) Filed: Feb. 18, 2021

Related U.S. Application Data

(63) Continuation of application No. 17/089,341, filed on Nov. 4, 2020, now Pat. No. 10,971,034.

(51) Int. Cl.
*G09B 21/00* (2006.01)
(52) U.S. Cl.
CPC .................... *G09B 21/004* (2013.01)
(58) Field of Classification Search
CPC .................................................. G09B 21/004
See application file for complete search history.

(56) References Cited

U.S. PATENT DOCUMENTS

| | | | | |
|---|---|---|---|---|
| 5,748,805 A * | 5/1998 | Withgott | ............... | G06F 40/169 |
| | | | | 715/236 |
| 9,965,974 B2 * | 5/2018 | Labbé | .................. | G09B 21/025 |
| 10,739,859 B2 * | 8/2020 | He | .......................... | G06F 3/016 |
| 10,971,034 B1 * | 4/2021 | Datray | .................... | G09B 7/06 |
| 11,120,706 B2 * | 9/2021 | Khermayer | ........... | G09B 21/005 |
| 11,295,632 B2 * | 4/2022 | Greiner | .................... | G06F 3/016 |
| 11,475,793 B2 * | 10/2022 | Californiaa | ............. | G10L 13/00 |
| 2014/0377721 A1 * | 12/2014 | Reid | .................... | G09B 21/005 |
| | | | | 434/114 |
| 2014/0377722 A1 * | 12/2014 | Reid | .................... | G09B 21/005 |
| | | | | 434/114 |
| 2015/0310766 A1 * | 10/2015 | Alshehri | .............. | G09B 21/003 |
| | | | | 434/114 |

OTHER PUBLICATIONS

Blazie Engineering, Incorporated, a division of Freedom Scientific, Inc., The PowerBraille Refreshable Braille Display User's Guide, 1998.

* cited by examiner

*Primary Examiner* — Vinh T Lam
(74) *Attorney, Agent, or Firm* — Dennemeyer & Associates LLC; Victoria Friedman

(57) ABSTRACT

A method of automatically partitioning a refreshable braille display based on presence of pertinent ancillary alphanumeric content. In an unpartitioned configuration, every braille cell of the refreshable braille display is used to output the primary alphanumeric content. When the refreshable braille display outputs a segment of the primary alphanumeric content having associated ancillary alphanumeric content, such as a footnote or a comment, the braille display is automatically partitioned into a first partition and a second partition. The braille cells of the first partition are allocated for outputting the primary alphanumeric content, while the braille cells of the second partition are allocated for outputting the ancillary alphanumeric content.

18 Claims, 8 Drawing Sheets

DYNAMIC PARTITIONING OF A REFRESHABLE BRAILLE DISPLAY BASED ON PRESENCE OF ANCILLARY ALPHANUMERIC CONTENT

CROSS REFERENCE TO RELATED APPLICATIONS

This application is a continuation of U.S. Nonprovisional patent application Ser. No. 17/089,341 filed Nov. 4, 2020, entitled "Dynamic Partitioning of a Refreshable Braille Display Based on Presence of Ancillary Alphanumeric Content" by the same inventors.

BACKGROUND OF THE INVENTION

Field of the Invention

This invention relates to refreshable braille displays. More specifically, it relates to a method of dynamically partitioning a refreshable braille display based on presence of ancillary alphanumeric content.

Background of the Invention

A refreshable braille display is a computer peripheral that connects to a computing device. One of the key functions of refreshable braille displays is to output text that would normally be displayed on a computer screen as lines of braille characters. Refreshable braille displays enable blind and visually impaired users to read electronic documents and operate computer applications using braille. A refreshable braille display typically contains one or more lines of braille cells, wherein each cell can be used to output a braille character corresponding to an alphanumerical character. A screen reader software, such as JAWS®, can be installed on a computing device to output text onto a refreshable braille display.

Unlike computer monitors that enable sighted users to simultaneously view an entire section of an electronic document, refreshable braille displays enable visually impaired users to view only a single line of braille characters at a time, essentially displaying only a single excerpt of text. Although this aspect of refreshable braille displays may not be much of an issue when reading an electronic document line-by-line, it becomes a major limitation when the electronic document includes ancillary content, such as an explanatory footnote or a spreadsheet cell heading.

In the current state of the art, refreshable braille displays are generally configured to output ancillary alphanumeric content displayed after displaying the primary content. For example, a footnote may be displayed immediately after a sentence to which it pertains or at the end of the page on which it appears. Both of these options disrupt the flow of the primary content. With the first option, the footnote essentially becomes embedded into the primary text of the document, therefore changing the natural order in which the user would read the document. With the second option, the footnote is provided out of context and may lose its pertinence. Thus, what is needed is a software-based method that automatically displays ancillary alphanumeric content alongside primary alphanumeric content on a refreshable braille display.

SUMMARY OF THE INVENTION

The long-standing but heretofore unfulfilled need for software-based method for automatically displaying ancillary alphanumeric content alongside primary alphanumeric content on a refreshable braille display is now met by a new, useful, and nonobvious invention.

In an embodiment, the present invention pertains to a method of dynamically partitioning a refreshable braille display when pertinent ancillary alphanumeric content is present. The refreshable braille display has a plurality of braille cells. In a default configuration, when a first segment of the primary alphanumeric content does not have associated ancillary content, every braille cell of a refreshable braille display is allocated for outputting the first segment of the primary alphanumeric content. As used herein, the term "segment" may refer to a character, a word, a word combination, a sentence, a paragraph, a page, or a combination thereof.

When the output of the refreshable braille display progresses onto a second segment of the primary alphanumeric content, the software application determines whether the second segment of the primary alphanumeric content has associated ancillary alphanumeric content. If it is determined that the second segment of the primary alphanumeric content has associated ancillary alphanumeric content, the refreshable braille display is automatically partitioned into a first partition having a first set of braille cells and a second partition having a second set of braille cells. The second segment of the primary alphanumeric content is output onto the first partition using the first set of the plurality of braille cells, while the ancillary alphanumeric content is output onto the second partition using the second set of the plurality of braille cells.

Next, the method involves determining whether the ancillary alphanumeric content is associated with a third segment of the primary alphanumeric content. If it is determined that the ancillary alphanumeric content is not associated with the third segment of the primary alphanumeric content, all braille cells are once again allocated for output of the primary alphanumeric content. Accordingly, the third segment of the primary alphanumeric content is output onto the refreshable braille display using all braille cells of the refreshable braille display.

In an embodiment, the first partition of the refreshable braille display outputting the primary alphanumeric content and the second partition of the refreshable braille display outputting the ancillary alphanumeric content are configured to be navigated independently of one another.

The refreshable braille display can be configured to revert to the unpartitioned configuration based on a user input or when the user navigates the braille display output to the third segment of the primary alphanumeric content, which does not have associated ancillary alphanumeric content.

In an embodiment, the braille cells may be evenly allocated between the first partition and the second partition. In another embodiment, a quantity of braille cells in the second set of the plurality of the braille cells may be determined based on a length of the ancillary alphanumeric content.

The refreshable braille display may have a first line of braille cells and a second line of braille cells. For such dual-line displays, the first line of braille cells may be allocated for the first partition and the second line of braille cells may be allocated for the second partition.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
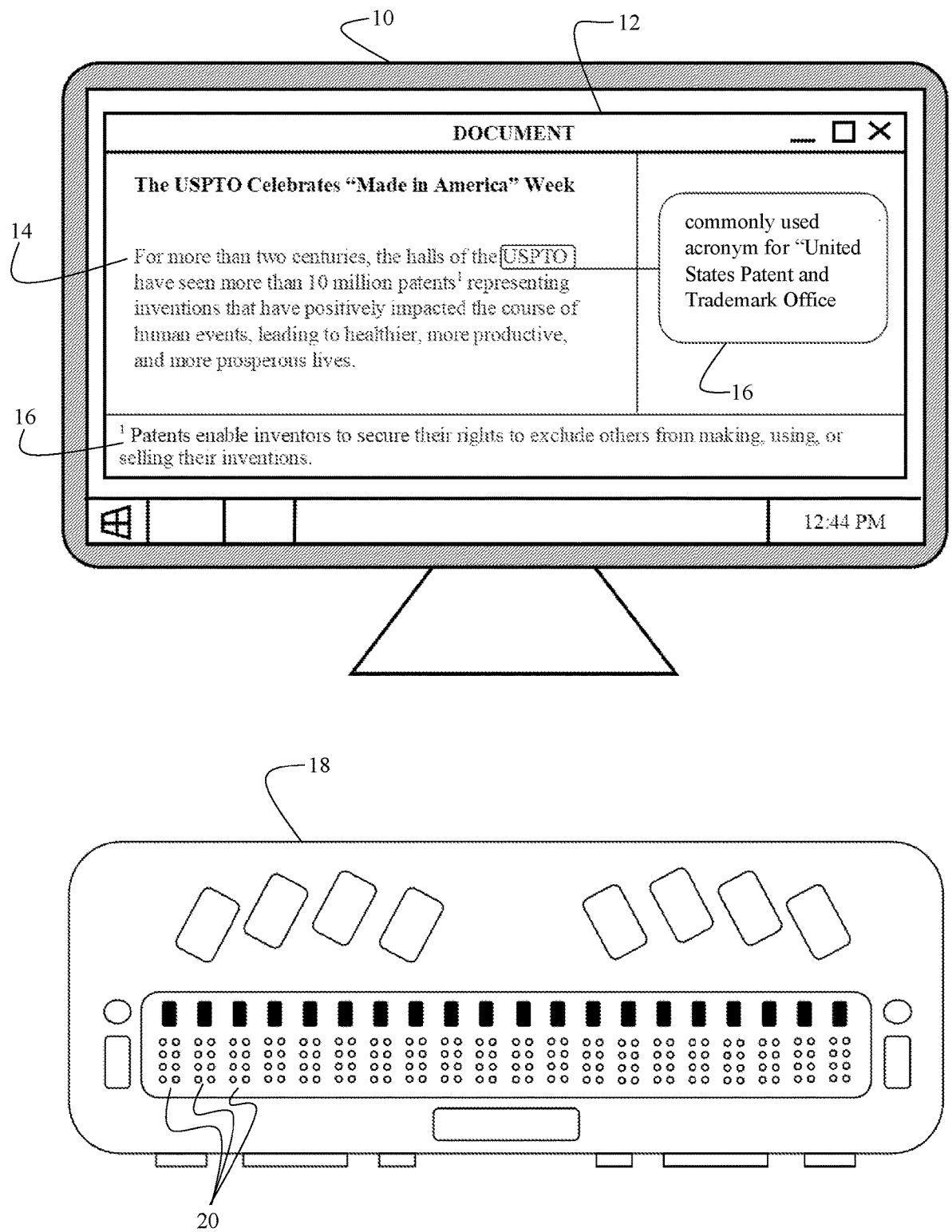
FIG. 1 is a conceptual view depicting a refreshable braille display in communication with a computing device displaying an electronic document.

In an embodiment, the invention pertains to a method of dynamically partitioning a refreshable braille display to simultaneously output primary and ancillary alphanumeric content. FIG. 1 depicts a monitor display of a computing device 10. Computing device 10 comprises one or more non-transitory tangible media having a set of instructions stored thereon and one or more processors configured to execute these instructions.

FIG. 1 depicts an electronic document 12 being displayed on the screen of computing device 10. Electronic document 12 may be a webpage, a PDF document, a word processor document, an electronic table, an electronic presentation, an email, or any other document or application having alphanumeric content.

FIG. 1 depicts electronic document 12 having primary alphanumeric content 14 and ancillary alphanumeric content 16. Primary alphanumeric content 14 forms the body of the electronic document 12, while ancillary alphanumeric content 16 may be located outside the body of electronic document 12. Ancillary alphanumeric content 16 may pertain to a specific segment of primary alphanumeric content 14 and, generally, provides pertinent supplementary information associated with that specific segment of primary alphanumeric content 14. As used herein, the term "segment" may refer to a character, a word, a word combination, a sentence, a paragraph, a page, or a combination thereof.

For example, primary alphanumeric content 14 can be the body of a word processing document, as depicted in FIG. 1. In this example, ancillary alphanumeric content 16 may be in the form of a review or explanatory comment, a footnote, an endnote, etc. Another example is a slide of an electronic presentation, wherein primary alphanumeric content 14 is the body of the presentation slide, while ancillary alphanumeric content 16 is the presenter's notes that are not a part of the slide itself. Another example is an electronic spreadsheet in which content of a cell is primary alphanumeric content 14, while cell labels constitute ancillary alphanumeric content 16, or vise-versa. In an email application, primary alphanumeric content 14 can be the email list, while ancillary alphanumeric content 16 can be content of an individual email message. In a website, primary alphanumeric content 14 can be the body of the webpage, while ancillary alphanumeric content 16 can be the text captions associated with embedded images. A person of ordinary skill in the art will appreciate that the above examples are not exhaustive, and primary alphanumeric content 14 and ancillary alphanumeric content 16 may be present in many different forms in various electronic documents and software applications.

FIG. 1 further depicts a refreshable braille display 18. Braille display 18 communicates with computing device 10. Braille display 18 contains a plurality of braille cells 20, each typically comprising a set of eight pins. The pins are configured to be selectively raised, such that each braille cell 20 outputs a braille character corresponding to an alphanumerical character within electronic document 12. In this manner, braille display 18 can be used in conjunction with, or in lieu of, a display screen to read content of electronic document 12. Refreshable braille display 18 enables a blind or a visually impaired user to read alphanumeric output of the computing device by scanning braille cells 20 with fingertips.

When reading electronic document 12, a user of refreshable braille display 18 is typically restricted to a single line of text outputted onto braille display 18 at any given time. Therefore, unlike sighted users who can view electronic document 12 in its entirety, including primary alphanumeric content 14 and ancillary alphanumeric content 16, braille users are generally restricted to reading a single segment of text at any given time. Thus, in the current state of the art, unlike sighted users, braille users cannot simultaneously view primary alphanumeric content 14 and associated ancillary alphanumeric content 16. This shortcoming constitutes a major disadvantage for braille users. The present invention addresses this problem by providing a software-based solution that automatically partitions braille display 18 when pertinent ancillary alphanumeric content 16 is present.

Figure 2A:
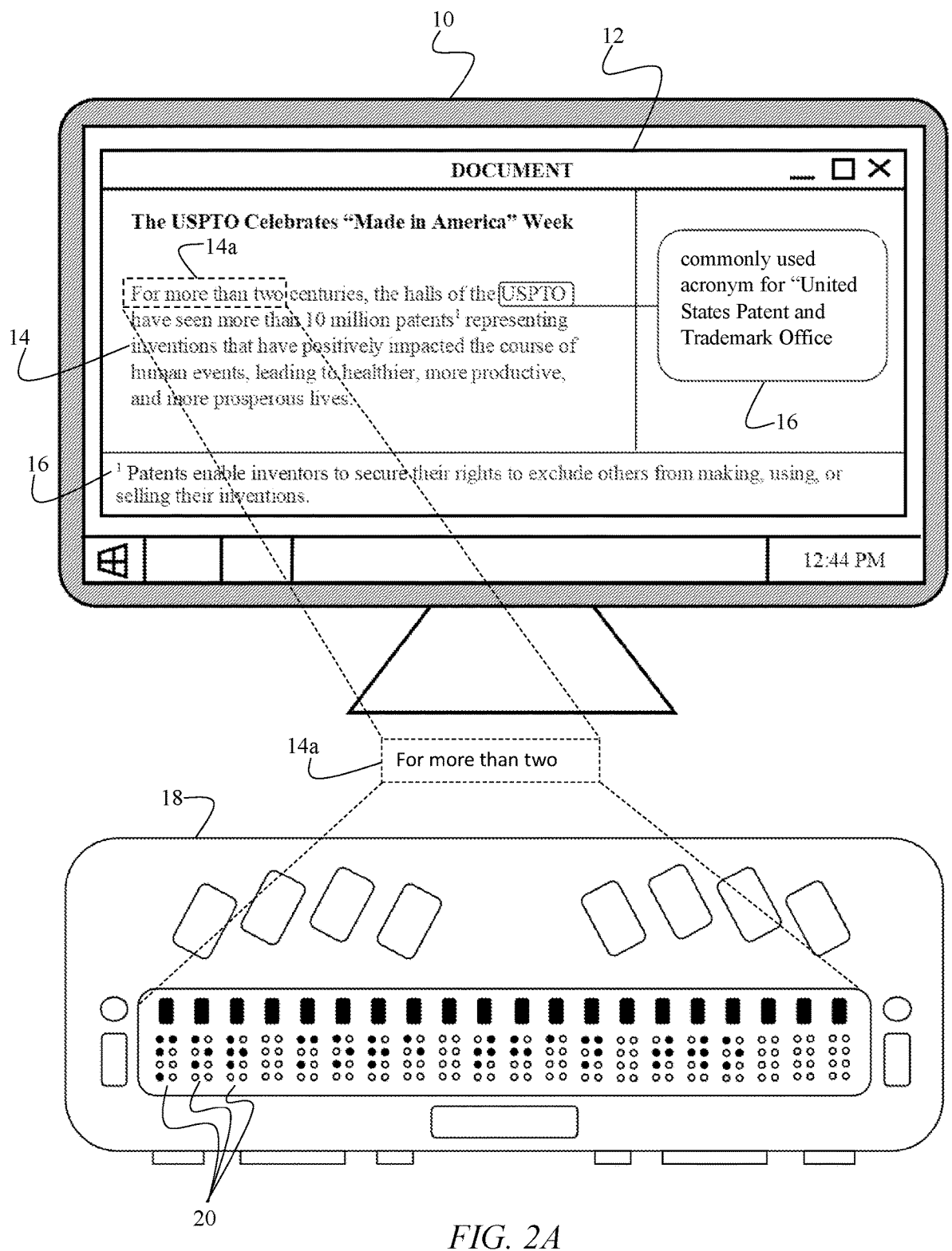
FIG. 2A is a conceptual view depicting an unpartitioned configuration of the refreshable braille display in which all braille cells are allocated for outputting primary alphanumeric content.

FIG. 2A depicts refreshable braille display 18 outputting a first segment 14a of primary alphanumeric content 14. First segment 14a that does not have associated ancillary alphanumeric content 16. Accordingly, FIG. 2A depicts that every braille cell 20 of braille display 18 is used to output first segment 14a of primary alphanumeric content 14.

Figure 2B:
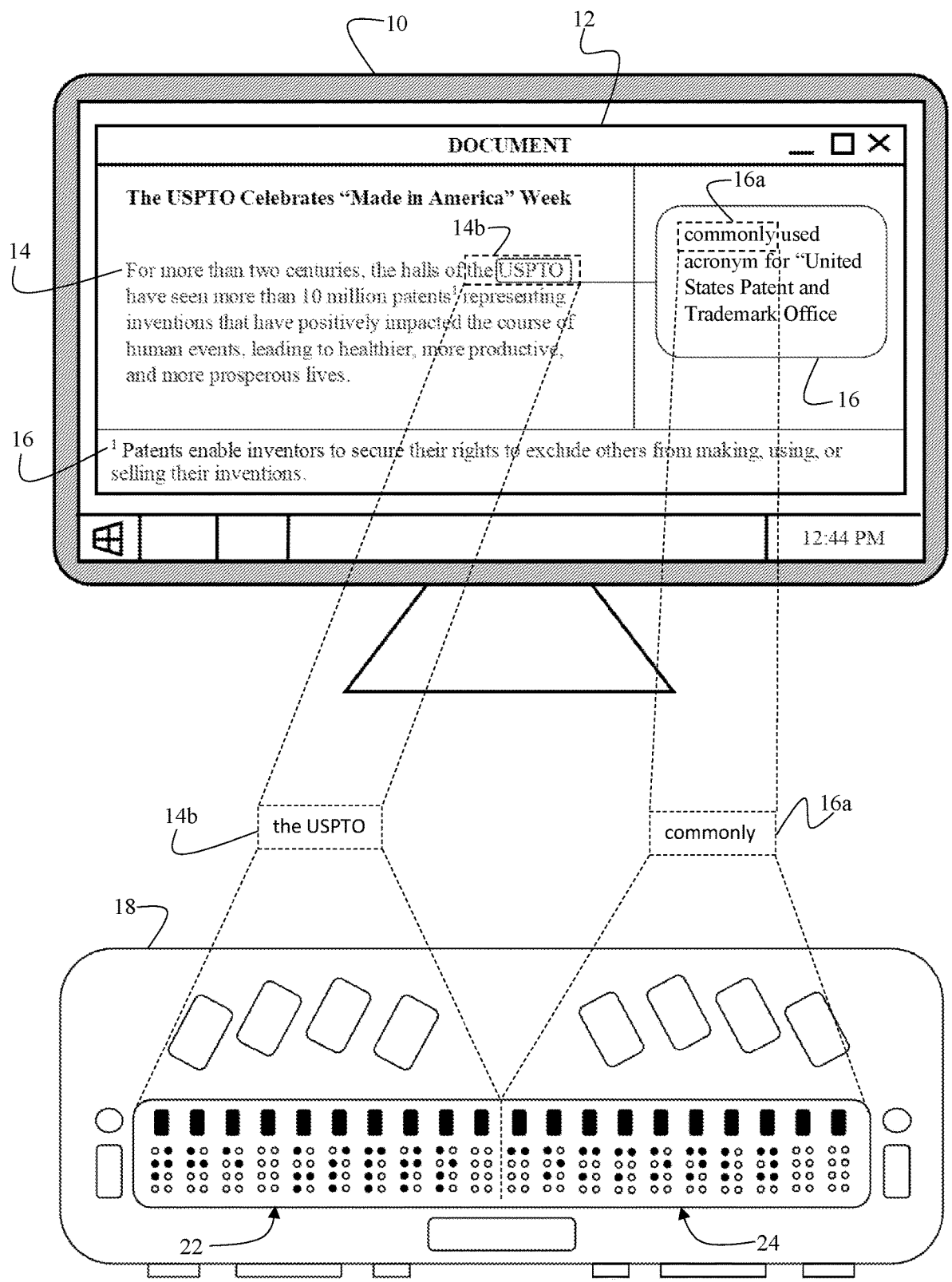
FIG. 2B is a conceptual view depicting a partitioned configuration of the refreshable braille display, in which the first partition is used to output the primary alphanumeric content, while the second partition is used to output the associated ancillary alphanumeric content.

Next, FIG. 2B depicts that the output provided on braille display 18 progresses through primary alphanumeric content 14 and reaches a second segment 14b of primary alphanumeric content 14. Second segment 14b has associated ancillary alphanumeric content 16, in a form of an explanatory note. Responsive to detecting presence of ancillary alphanumeric content 16, the software application deployed on computing device 10 automatically partitions braille display 18 by dividing braille cells 20 into a first partition 22 and a second partition 24. First partition 22 is dedicated to outputting primary alphanumeric content 14, while second partition 24 is dedicated to outputting ancillary alphanumeric content 16. FIG. 2B depicts that first partition 22 of braille display 18 is used to output second segment 14b of primary alphanumeric content 14, while second partition 24 contemporaneously outputs a first segment 16a of ancillary alphanumeric content 16.

Figure 2C:
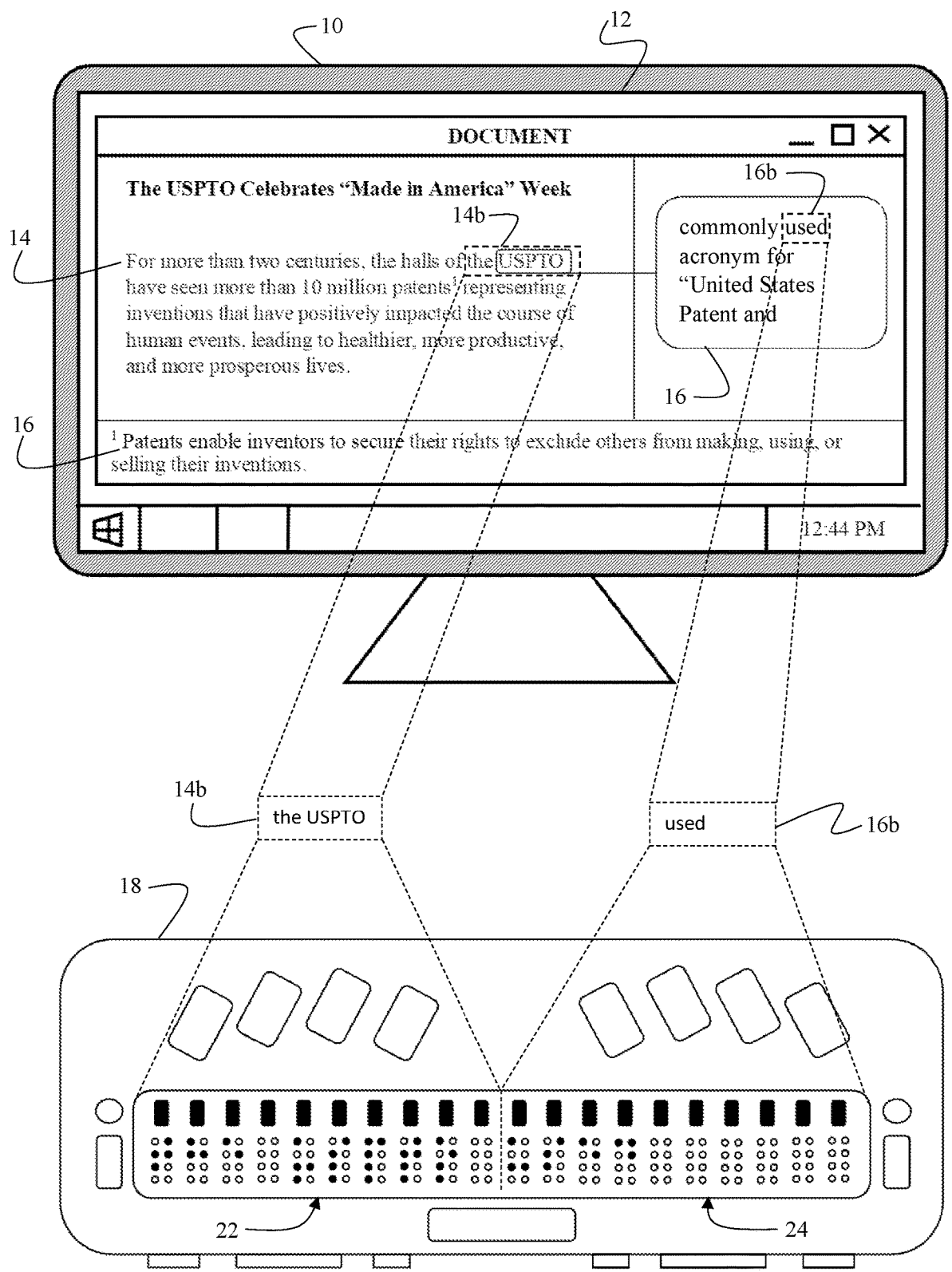
FIG. 2C is a conceptual view depicting the refreshable braille display in a partitioned configuration, illustrating that the user can independently navigate alphanumeric content displayed on the first and the second partitions of the refreshable braille display.

As depicted in FIGS. 2B-C, a braille user can independently navigate braille output of each partition 22 and 24. FIG. 2C depicts second partition 24 of braille display 18 displaying segment 16b of ancillary alphanumeric content 16, while first partition 22 continues to display segment 14b of primary alphanumeric content 14.

The partitioned configuration of braille display 18 depicted in FIGS. 2B-C enables the user to contemporaneously read primary alphanumeric content 14 and associated ancillary alphanumeric content 16 on a single braille display 18. In this manner, the user can read pertinent ancillary alphanumeric content 16 with one hand, while reading corresponding primary alphanumeric content 14 with the other hand. Therefore, when reading ancillary alphanumeric content 16, the present invention provides the braille user with the benefit of contemporaneously reading primary alphanumeric content 14 and ancillary alphanumeric content 16 to gain context of the pertinence of ancillary alphanumeric content 16.

The example provided in FIGS. 2B-C illustrates that, when braille display 18 outputs the acronym "USPTO", the software application, which can be deployed on computing device 10 or braille display 18, automatically detects the presence of ancillary alphanumeric content 16. In response to detecting the presence of ancillary alphanumeric content 16, the software application automatically triggers partitioning of braille display 18 into first partition 22 and second partition 24. First partition 22 continues to display primary alphanumeric content 14, while second partition 24 displays ancillary alphanumeric content 16.

FIG. 2B depicts that first partition 22 of braille display 18 continues to display second segment 14b of primary alphanumeric content 14—in this example, the word "USPTO." At the same time, second partition 24 of braille display 18 displays ancillary alphanumeric content 16—in this example, explanatory comment pertaining to the acronym "USPTO." By having both sets of alphanumeric output side-by-side, the braille user gains context for the explanatory comment provided in ancillary alphanumeric content 16. As depicted in FIG. 2C, the braille user can independently navigate the first partition 22 and second partition 24 to gain additional context.

As described above, the present invention can be configured to issue a command partitioning braille display 18 in response to braille display 18 outputting a segment of primary alphanumeric content 14 having associated ancillary alphanumeric content 16. In the example depicted in FIGS. 2B-C, the invention is configured to automatically issue a command partitioning braille display 18 when braille display 18 outputs second segment 14b containing the word "USPTO." However, this scenario is merely exemplary, and a person of ordinary skill in the art will understand that the invention can be configured to automatically partition braille display 18 at the beginning of a sentence, a paragraph, or a page when associated ancillary alphanumeric content 16 is present.

After braille display 18 has been partitioned into a first partition 22 and a second partition 24, as depicted in FIGS. 2B-C, braille display 18 may remain in this partitioned configuration until a predefined event occurs, at which point braille display 18 automatically reverts to its default unpartitioned state. Examples of such predefined events include the following: passage of a predefined time duration; a user navigating first partition 22 past a predefined point, for example, end of the segment with which ancillary alphanumeric content 16 is associated; a user navigating second partition 24 past a predefined point, for example, the end of ancillary alphanumeric content 16; or in response to a predefined user input.

Figure 2D:
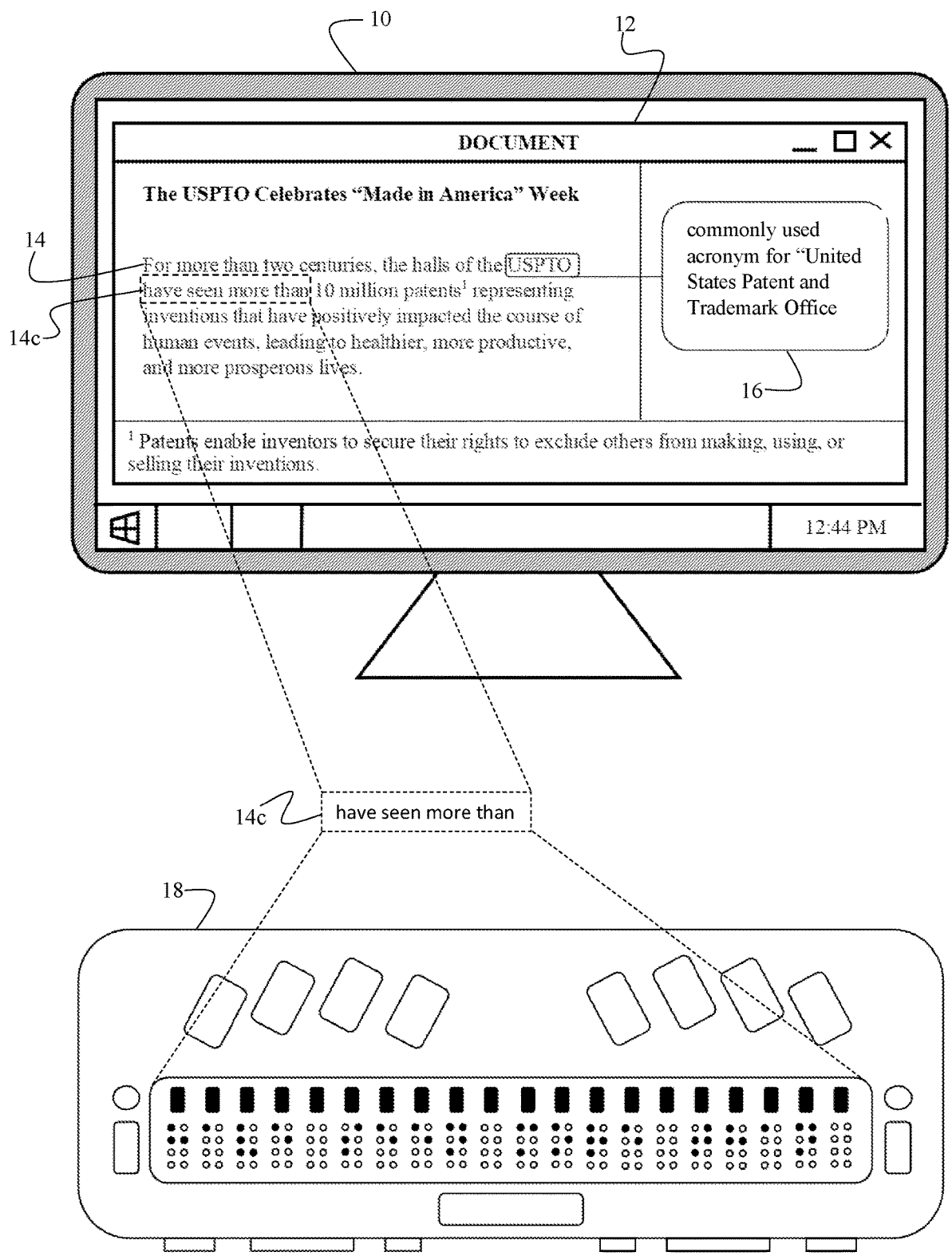
FIG. 2D is a conceptual view depicting the refreshable braille display reverted to an unpartitioned configuration, in which every braille cell is used to output primary alphanumeric content.

FIG. 2D depicts that, the user navigates first partition 22 of braille display 18 past second segment 14b of primary alphanumeric content 14. Next, braille display 18 outputs a third segment 14c of primary alphanumeric content 14. Because third segment 14c does not have associated ancillary content 16, braille display 18 automatically reverts to its unpartitioned configuration. In this unpartitioned configuration, every braille cell 20 is dedicated to displaying third segment 14c of primary alphanumeric content 14.

As explained above, when primary alphanumeric content 14 does not have any associated ancillary alphanumeric content 16, braille display 18 automatically reverts to its unpartitioned configuration so that every braille cell 20 can be used to output primary alphanumeric content 14. These steps are executed automatically, without requiring the user to toggle between partitioned and unpartitioned configurations. Therefore, the user can simply focus on reading primary alphanumeric content 14 using braille display 18. When braille display 18 reaches the portion of primary alphanumeric content 14 that has associated ancillary alphanumeric content 16, the software application will automatically partition braille display 18 and display ancillary alphanumeric content 16 alongside primary alphanumeric content 14. After the user finishes reading ancillary alphanumeric content 16 or navigates primary alphanumeric content 14 past the segment to which ancillary alphanumeric content 16 pertains, braille display 18 automatically reverts to the unpartitioned configuration, in which the entire braille display 18 is used to output subsequent segments of primary alphanumeric content 14. In the partitioned configuration, the user can navigate primary alphanumeric content 14 displayed in first partition 22 and ancillary alphanumeric content 16 displayed in second partition 24 independently of one another.

Figure 2E:
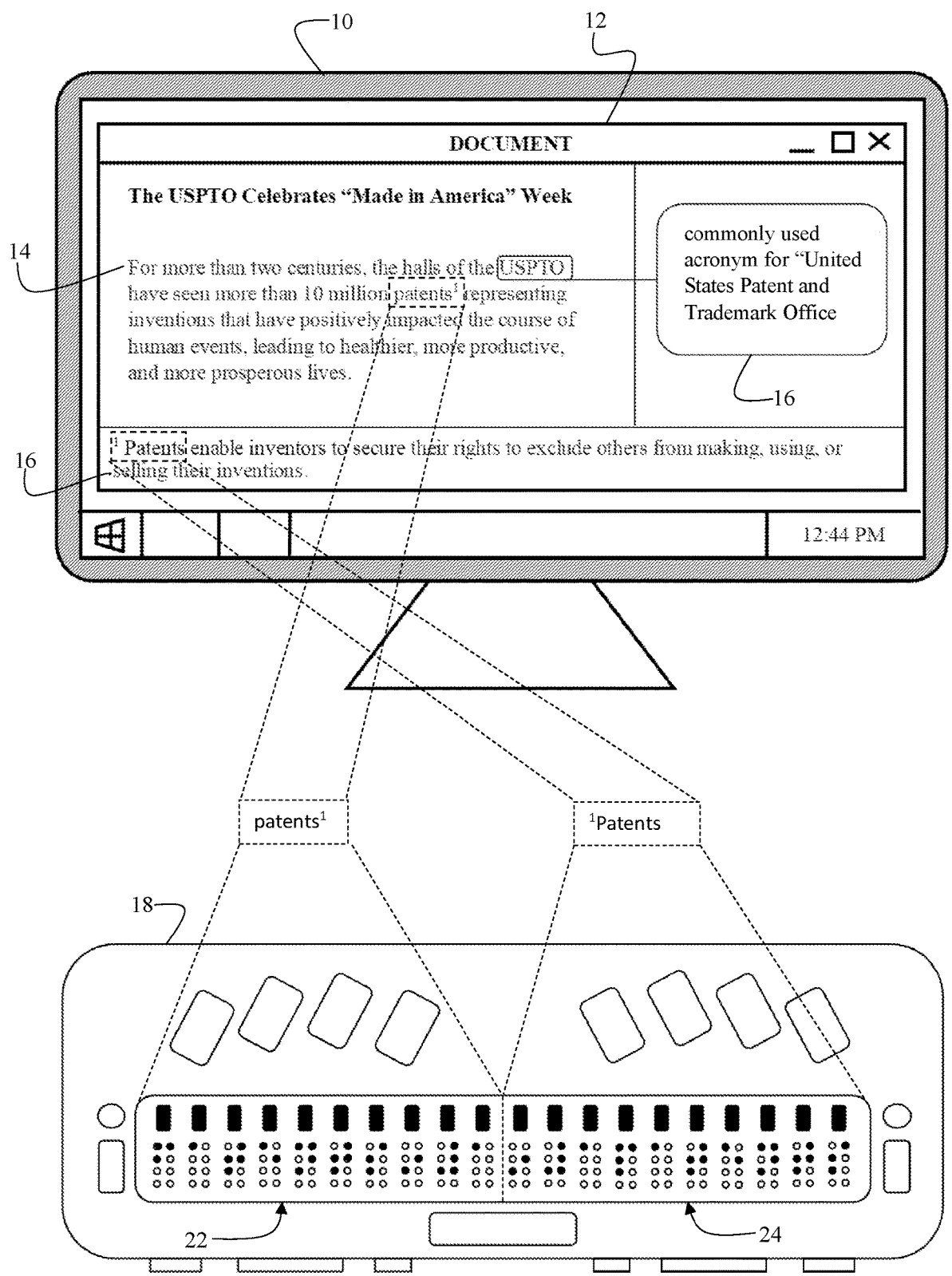
FIG. 2E is a conceptual view depicting the refreshable braille display in a partitioned configuration, in which the first partition is used to output the primary alphanumeric content, while the second partition is used to output the associated ancillary content—i.e, a footnote.
Figure 2F:
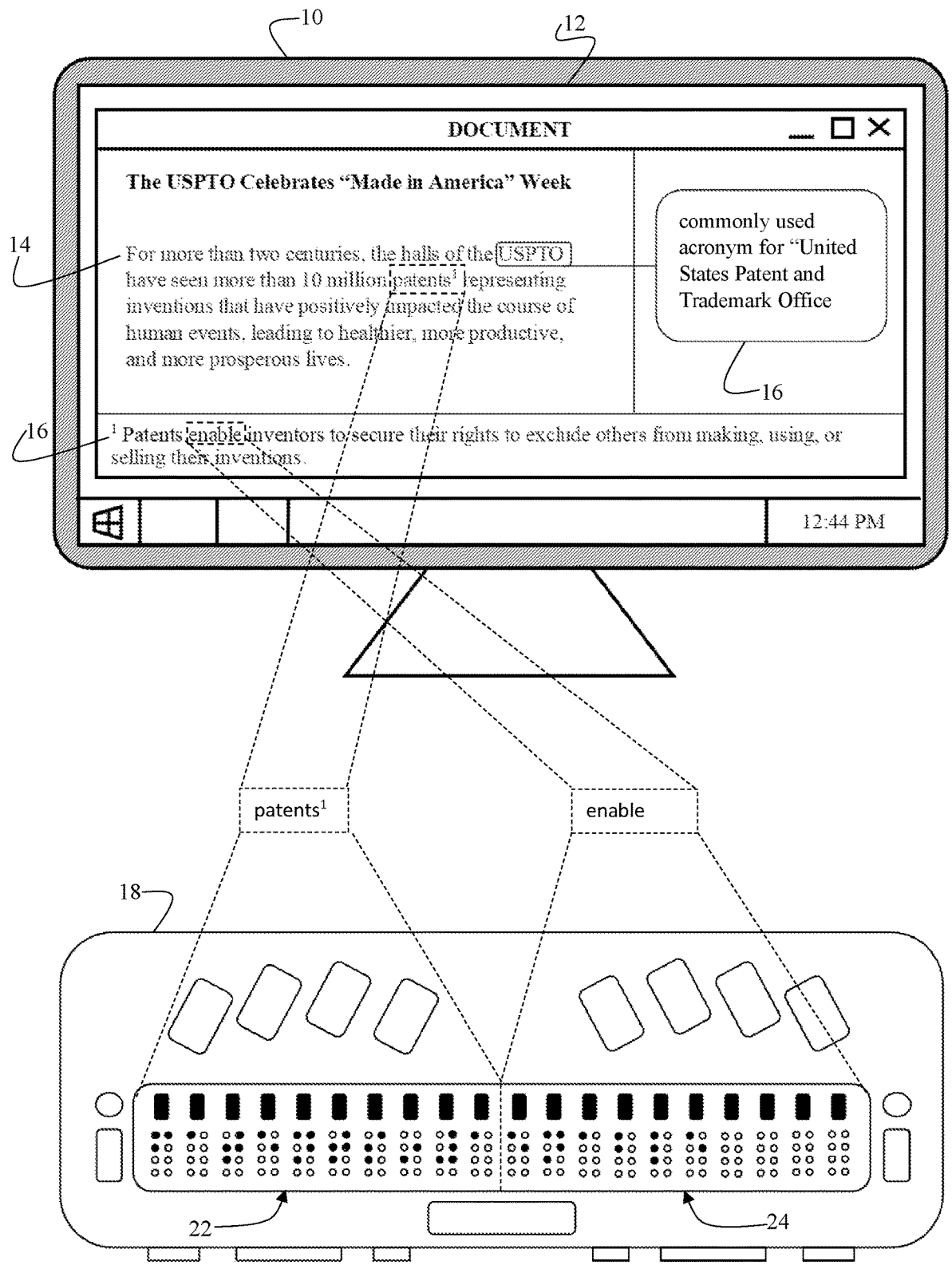
FIG. 2F is a conceptual view depicting the refreshable braille display in a partitioned configuration, illustrating that the user can independently navigate alphanumeric content displayed on the first and the second partitions of the refreshable braille display.

FIGS. 2E-F depict another instance of automatically partitioning braille display 18 based on presence of ancillary alphanumeric content 16. FIG. 2D depicts unpartitioned configuration of braille display 18 in which every braille cell 20 is used to output primary alphanumeric content 14. Next, FIG. 2E depicts that, upon outputting next segment of primary alphanumeric content 14—i.e., word "patent"— having associated ancillary alphanumeric content 16—i.e., footnote 1—braille display 18 is automatically partitioned to display primary alphanumeric content 14 and ancillary alphanumeric content 16 side-by-side. As explained above, when the software application detects that the segment of primary alphanumeric content 14 currently being displayed on braille display 18 has associated ancillary alphanumeric content 16, the software application issues a command triggering partitioning of braille display 18. This command is issued automatically and does not require the user to manually toggle between the partitioned and unpartitioned configurations.

The resultant partitioned braille display 18 is depicted in FIG. 2E-F. First partition 22 displays primary alphanumeric content 14, while second partition 24 displays associated ancillary alphanumeric content 16.

In some embodiments, when partitioning braille display 18, the present invention can be configured to dynamically allocate the number of braille cells 20 to ancillary alphanumeric content 16 based on the length or type thereof. For example, a greater number of braille cells 20 can be dedicated to footnotes than review comments, or, the number of braille cells 20 can be calculated based on number of words or characters in ancillary alphanumeric content 16.

Furthermore, some braille displays 18 have multiple lines of braille cells 20. For such multi-line braille displays 18, the present invention can be configured to partition braille display 18 such that first partition 22 comprises one or more full lines of braille cells 20 dedicated to displaying primary alphanumeric content 14, while second partition 24 comprises one or more full lines of braille cells 20 dedicated to displaying ancillary alphanumeric content 16. The number of braille lines allocated to each partition can be dynamically adjusted based on various criteria, including the amount of ancillary alphanumeric content 16, type of alphanumeric content 16, etc.

Figure 3:
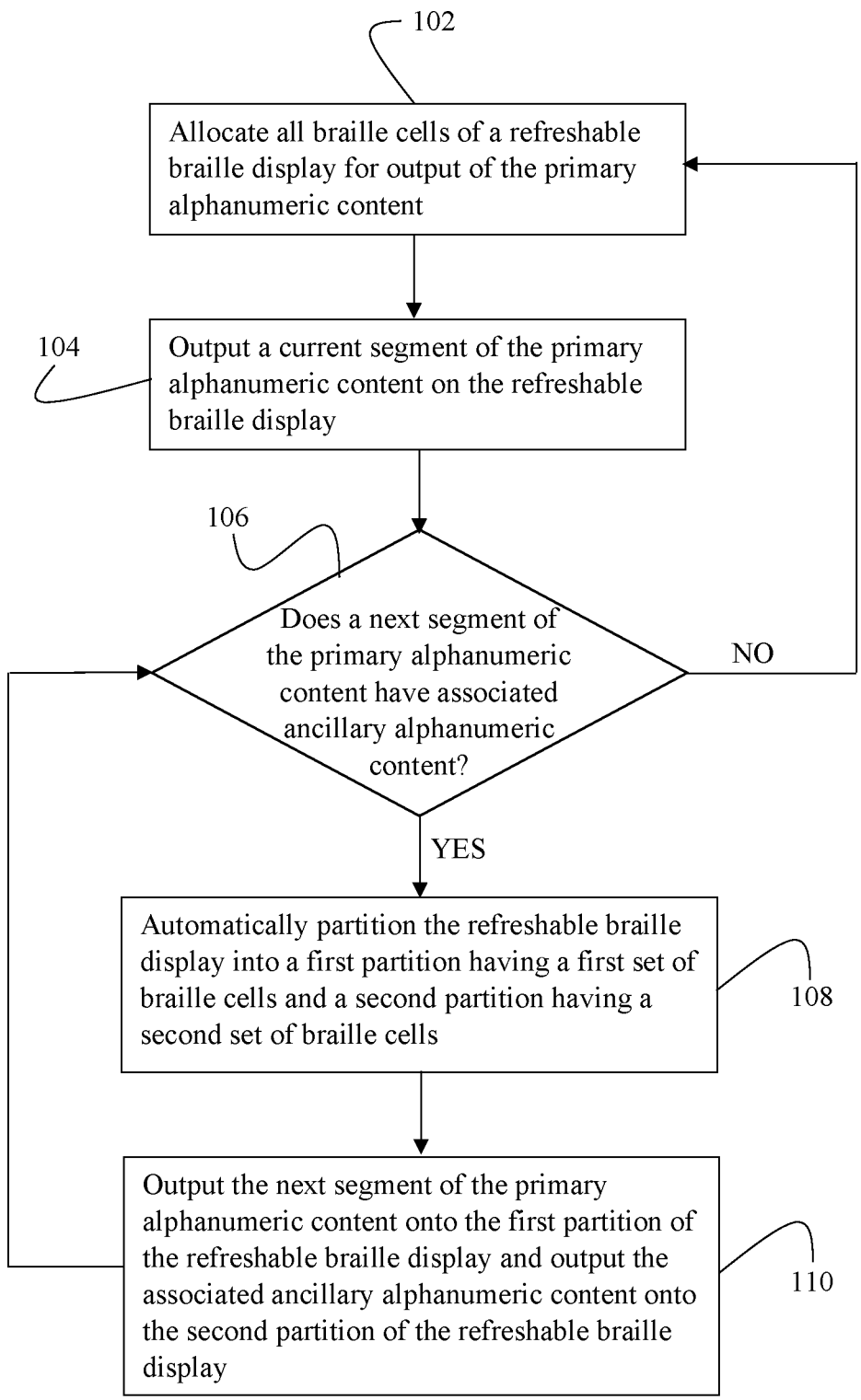
FIG. 3 is a flowchart depicting the steps of the method of dynamically partitioning the refreshable braille display when the primary alphanumeric content has associated ancillary alphanumeric content.

FIG. 3 depicts a flowchart of the dynamic automatic partitioning process. In step 102, refreshable braille display 18 is in its default unpartitioned configuration, in which every braille cell 20 is allocated for output of primary alphanumeric content 14. In step 104, braille display 18 outputs the current segment of primary alphanumeric content 14 using all braille cells 20 of braille display 18. In step 106, a determination is made as to whether the next segment of primary alphanumeric content 14 has associated ancillary alphanumeric content 16. If there is no associated ancillary alphanumeric content, then the method continues to proceed in accordance with steps 102 and 104: braille display 18 remains in its unpartitioned state and primary alphanumeric content 14 is output using all braille cells 20.

On the other hand, if in step 104, it is determined that the next segment of primary alphanumeric content 14 has associated ancillary alphanumeric content 16, then the method proceeds to step 106. In step 106, braille display 18 is partitioned into a first partition 22 and second partition 24. In step 108, the "next" segment of primary alphanumeric content from step 104 becomes the "current" segment and is displayed using the set of braille cells 20 allocated to first partition 22. Simultaneously, ancillary alphanumeric content 16 is output using braille cells 20 allocated to second partition 24. When the output of braille display 18 proceeds to the next segment of primary alphanumeric content 14, the method returns to step 106 and continues accordingly.

Hardware and Software Infrastructure Examples

The present invention may be embodied on various computing platforms that perform actions responsive to software-based instructions and most particularly for low-vision user software. These include both traditional desktop and notebooks devices and also smartphones and tablets. Furthermore, the computing device may reside within the braille display, thus making the braille display a standalone reader for electronic documents. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of dynamically partitioning a refreshable braille display having a plurality of braille cells to simultaneously display a primary alphanumeric content and an ancillary alphanumeric content associated therewith, the method comprising the steps of:
   outputting a first segment of the primary alphanumeric content onto the refreshable braille display, wherein the first segment of the primary alphanumeric content is output using the plurality of the braille cells of the refreshable braille display;
   determining whether a second segment of the primary alphanumeric content has the ancillary alphanumeric content associated therewith;
   responsive to determining that the second segment of the primary alphanumeric content has the ancillary alphanumeric content associated therewith, automatically partitioning the refreshable braille display into a first partition having a first set of the plurality of braille cells and a second partition having a second set of the plurality of braille cells; and
   outputting the second segment of the primary alphanumeric content using the first set of the plurality of braille cells, and outputting the ancillary alphanumeric content using the second set of the plurality of braille cells.

2. The method of claim 1, wherein the first partition of the refreshable braille display outputting the primary alphanumeric content and the second partition of the refreshable braille display outputting the ancillary alphanumeric content are configured to be navigated independently of one another.

3. The method of claim 2, wherein responsive to a user navigating past the second segment of the primary alphanumeric content on the first partition of the refreshable braille display, the braille display is automatically reverted to an unpartitioned state, whereby both the first and the second sets of the plurality of the braille cells are used to output the primary alphanumeric content.

4. The method of claim 3, wherein the refreshable braille display is configured to navigate past the second segment of the primary alphanumeric content responsive to a predetermined user input.

5. The method of claim 1, wherein the second segment of the primary alphanumeric content is selected from the group consisting of a character, a word, a word combination, a sentence, a paragraph, a page, and a combination thereof.

6. The method of claim 1, wherein the plurality of the braille cells is allocated evenly between the first partition and the second partition.

7. The method of claim 1, wherein a quantity of braille cells in the second set of the plurality of the braille cells is determined based on a length or a type of the ancillary alphanumeric content.

8. The method of claim 1, wherein the refreshable braille display has a first line of braille cells and a second line of braille cells, and wherein the partitioning of the refreshable braille display comprises allocating the first line of braille cells to the first partition and allocating the second line of braille cells to the second partition.

9. The method of claim 1, wherein the partitioning of the refreshable braille displayed is triggered automatically via a command issued by the computing device when a user navigates the refreshable braille display to the second segment of the primary alphanumeric content.

10. One or more non-transitory tangible computer-readable media having computer-executable instructions for outputting alphanumerical characters onto a refreshable braille display, the instructions comprising:
    outputting a first segment of a primary alphanumeric content onto the refreshable braille display, wherein the first segment of the primary alphanumeric content is output using the plurality of the braille cells of the refreshable braille display;
    determining whether a second segment of the primary alphanumeric content has an ancillary alphanumeric content associated therewith;
    responsive to determining that the second segment of the primary alphanumeric content has the ancillary alphanumeric content associated therewith, automatically partitioning the refreshable braille display into a first partition having a first set of the plurality of braille cells and a second partition having a second set of the plurality of braille cells;
    outputting the second segment of the primary alphanumeric content using the first set of the plurality of braille cells, and outputting the ancillary alphanumeric content using the second set of the plurality of braille cells.

11. The non-transitory computer-readable media of claim 10, wherein the first partition of the refreshable braille display outputting the primary alphanumeric content and the second partition of the refreshable braille display outputting the ancillary alphanumeric content are configured to be navigated independently of one another.

12. The non-transitory computer-readable media of claim 10, wherein responsive to a user navigating past the second segment of the primary alphanumeric content on the first partition of the refreshable braille display, the braille display is automatically reverted to an unpartitioned state, whereby both the first and the second sets of the plurality of the braille cells are used to output the primary alphanumeric content.

13. The non-transitory computer-readable media of claim 12, wherein the refreshable braille display is configured to navigate past the second segment of the primary alphanumeric content responsive to a predetermined user input.

14. The non-transitory computer-readable media of claim 10, wherein the second segment of the primary alphanumeric content is selected from the group consisting of a character, a word, a word combination, a sentence, a paragraph, a page, and a combination thereof.

15. The non-transitory computer-readable media of claim 10, wherein the plurality of the braille cells is allocated evenly between the first partition and the second partition.

16. The non-transitory computer-readable media of claim 10, wherein a quantity of braille cells in the second set of the plurality of the braille cells is determined based on a length of the ancillary alphanumeric content.

17. The non-transitory computer-readable media of claim 10, wherein the refreshable braille display has a first line of braille cells and a second line of braille cells, and wherein the partitioning of the refreshable braille display comprises allocating the first line of braille cells to the first partition and allocating the second line of braille cells to the second partition.

18. The non-transitory computer-readable media of claim 10, wherein the partitioning of the refreshable braille displayed is triggered automatically via a command issued by the computing device when a user navigates the refreshable braille display to the second segment of the primary alphanumeric content.

* * * * *